US012792843B2

(12) United States Patent
Dey et al.

(10) Patent No.: US 12,792,843 B2
(45) Date of Patent: Nov. 10, 2026

(54) SYSTEM AND METHOD FOR RESOURCE EFFICIENT NATURAL LANGUAGE PROCESSING

(71) Applicant: Siemens Aktiengesellschaft, Munich (DE)

(72) Inventors: Biswadip Dey, Plainsboro, NJ (US); Tongtao Zhang, Plainsboro, NJ (US); Yaofeng Zhong, West Windsor, NJ (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1036 days.

(21) Appl. No.: 17/690,647

(22) Filed: Mar. 9, 2022

(65) Prior Publication Data

US 2022/0292266 A1 Sep. 15, 2022

Related U.S. Application Data

(60) Provisional application No. 63/158,487, filed on Mar. 9, 2021.

(51) Int. Cl.

| | |
|---|---|
| ***G06F 40/40*** | (2020.01) |
| ***G06N 3/048*** | (2023.01) |
| ***G06N 3/08*** | (2023.01) |

(52) U.S. Cl.
CPC ............. *G06F 40/40* (2020.01); *G06N 3/048* (2023.01); *G06N 3/08* (2013.01)

(58) Field of Classification Search
CPC ........... G06F 40/40; G06N 3/048; G06N 3/08
See application file for complete search history.

(56) References Cited

U.S. PATENT DOCUMENTS

| | | | | |
|---|---|---|---|---|
| 8,935,137 | B1 * | 1/2015 | Han | G06F 17/13 703/6 |
| 2016/0019324 | A1 * | 1/2016 | Kanderian | G06F 17/10 703/2 |
| 2021/0390873 | A1 * | 12/2021 | Pu | G09B 7/02 |
| 2022/0028139 | A1 * | 1/2022 | Mitra | G06V 40/175 |
| 2022/0138536 | A1 * | 5/2022 | Li | G06N 3/047 706/25 |
| 2022/0198254 | A1 * | 6/2022 | Dalli | G06N 3/094 |

OTHER PUBLICATIONS

Neural Ordinary Differential Equations, Dec. 14, 2019, pp. 1-18, Chen et al. ("Chen").*
Neural Ordinary Differential Equations, Dec. 14, 2019, pp. 1-18, Chen et al.*

(Continued)

*Primary Examiner* — Sherrod L Keaton

(57) ABSTRACT

System and method for performing natural language processing are disclosed. An encoder includes a multi-head attention block for nonlinear transformation of inputs and a feed-forward network for learning parameters that result in best function approximation. Output of the multi-head attention block and the feed-forward network are coupled in parallel to produce a summed output. An ODE solver performs continuous depth integration of the summed output for reduced number of parameters.

13 Claims, 3 Drawing Sheets

(56) References Cited

OTHER PUBLICATIONS

Bender et al. "On The Dangers of Stochastic Parrots: Can Language Models Be Too Big?"; FAccT '21, Mar. 3-10, 2021, Virtual Event, Canada; ACM ISBN 978-1-4503-8309-Jul. 21, 2003; https://doi.org/10.1145/3442188.3445922 / Mar. 2021, pp. 610-623.
Brown et al.; "Language Models are Few-Shot Learners"; John Hopkins University, OpenAI; Jul. 22, 2020, pp. 1-75.
Devlin et al, "BERT: Pre-training of Deep Bidirectional Transformers for Language Understanding", Proceedings of NAACL-HLT Jun. 2019, pp. 4171-4186.
Vaswani et al., "Attention is all you need", in Advances in neural information processing systems, 2017, pp. 5998-6008.

* cited by examiner

SYSTEM AND METHOD FOR RESOURCE EFFICIENT NATURAL LANGUAGE PROCESSING

TECHNICAL FIELD

This application relates to machine learning. More particularly, this application relates to applying a machine learning model for resource efficient natural language processing (NLP) tasks.

BACKGROUND

Current state-of-the-art techniques in natural language processing (NLP), such as machine translation, natural language understanding, and information/knowledge extraction, rely heavily on the use of attention-based models. A popular machine learning model used for natural language tasks is Transformer. As illustrated in FIG. 1, Transformer 100 consists of an encoder 110, decoder 102, positional encodings 103 with concatenation operation at encoder 110 and decoder 102, input embedding 104, and output embedding 105. For NLP operation, given a sentence of words, an input x is embedded with positional encoding. Encoder 110 maps an input sequence of symbol representations x to a sequence of representations. A multi-head attention mechanism 111 performs self-attention processing on the inputs. The multi-headed attention mechanism 111 encodes information in a word vector about the relevant context of a given word, which allows the model to focus on relevant contexts at different length scales. A feed-forward network 113 performs a post processing operation to generate the sequence of representations z. Decoder 102 generates an output sequence y of symbols one element at a time. The original Transformer design uses L-layers in the encoder 110, where L=6 to perform sequential operations (e.g., 110_1, 110_2, . . . , 110_L, where L=6) and L layers for the decoder 102. Layers of encoder 110 are processed by Add and Norm components 112, 114 via skip feeds 115, 116 to perform residual connection followed by layer normalization, which are well known functions applied in deep architectures.

The performance of Transformer 100 scales with model size and training data. A common performance metric for automatically evaluating machine-translated text is the BLEU (Bilingual Evaluation Understudy) score. The original developer of Transformer reported an improved BLEU score for an English-to-German translation task from 27.3 to 28.4 when the number of parameters was increased from 65 million to 213 million for a model with six layers. However, training such big language models are resource intensive and restrictive for application in novel domains.

A conventional approach to address high-computation cost associated to training language models involves pre-training large language models on generic corpora and subsequently fine-tuning/adapting them for specific tasks. For example, BERT is model variation of Transformer which uses self-supervised learning to pretrain deep bidirectional representations from unlabeled text and then fine-tunes the model with a single output layer to learn state-of-the-art models for a wide range of tasks (e.g., question answering and language inference). The BERT-large model uses 24 Transformer layers and 340 million parameters. Another large-scale language model, GPT-3, uses 48 Transformer layers and 175 billion parameters, can be used in a variety of tasks. However, such pre-trained models often carry biases (e.g., gender-based, racial, age-based, and may other types) from the original corpora. In addition, pre-training such big language models is resource intensive. For example, pre-training the GPT-3 model requires several thousand petaflop/s-days.

SUMMARY

System and method for performing natural language processing are disclosed. An encoder includes a multi-head attention block for nonlinear transformation of inputs and a feed-forward network for learning parameters that result in best function approximation. Output of the multi-head attention block and the feed-forward network are coupled in parallel to produce a summed output. An ODE solver performs continuous depth integration of the summed output for reduced number of parameters compared to the baseline Transformer model.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and systems are disclosed to operate resource efficient natural language processing (NLP) using an enhanced encoder architecture. In contrast with a conventional encoder with multiple layers of a 2 sub-layer stack in sequential processing, the enhanced encoder of this disclosure operates with a single layer of a multi-head attention component in parallel with a feed forward network in combination with a Neural ODE (Ordinary Differential Equation) solver to perform continuous integration. In contrast with a conventional decoder with multiple layers of a 3 sub-layer stack in sequential processing, the enhanced decoder of this disclosure operates with a single layer of two multi-head attention components in parallel with a feed forward network in combination with a Neural ODE (Ordinary Differential Equation) solver to perform continuous integration. This novel configuration improves efficiency of computation resources for NLP tasks with reduced number of neural network parameters and equivalent quality scores compared with the baseline Transformer model. Both time invariant and time varying operations can be implemented by the enhanced encoder/decoder.

Figure 1:
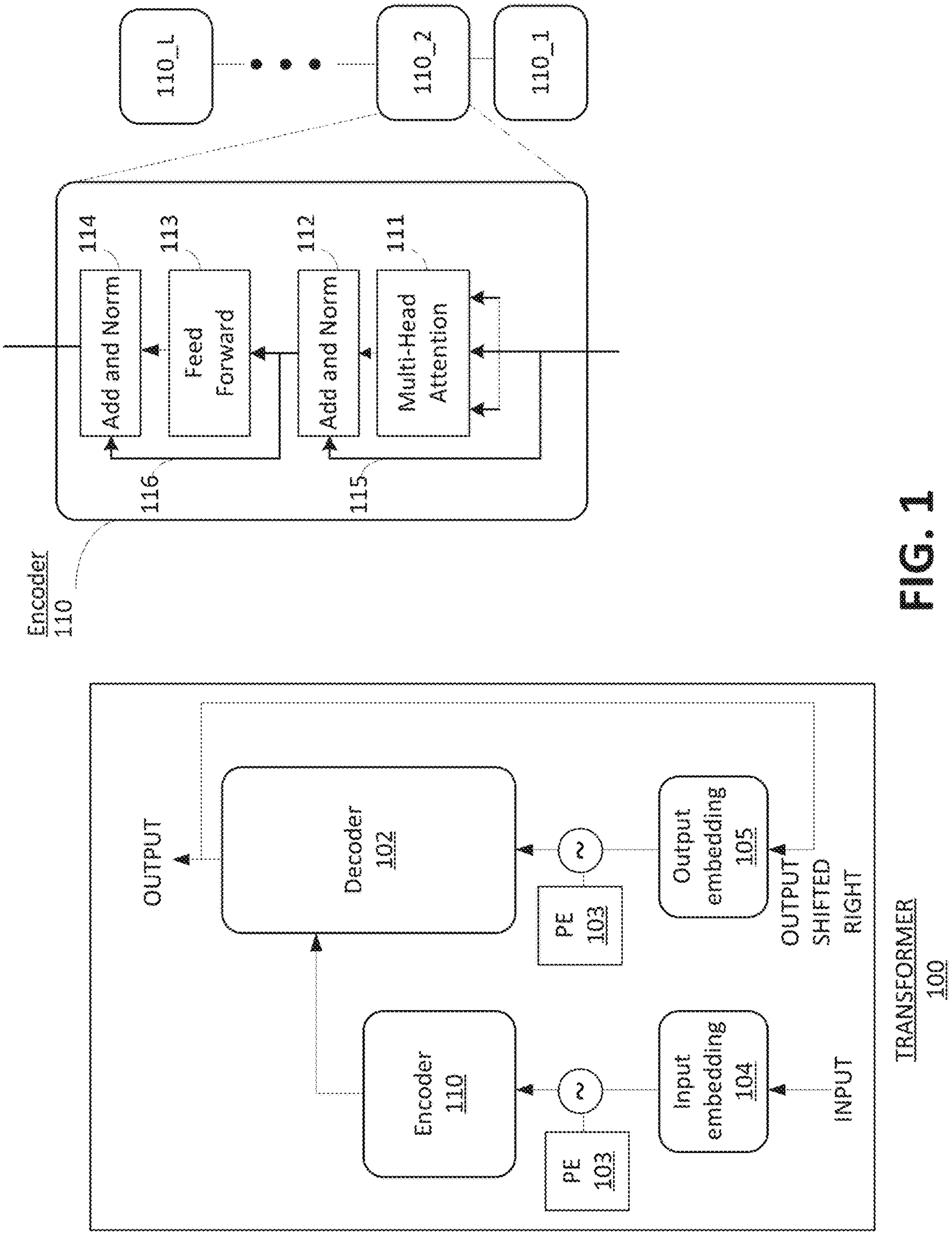
FIG. 1 PRIOR ART
FIG. 1 shows a block diagram of a Transformer model used for natural language processing (NLP).

Encoder 110 of Transformer model 100 can be represented by the following expression:

$$\tilde{x}_i^m = x_i^m + G(x_i^m, [x_1^m, x_2^m, \ldots, x_L^m]) \qquad \text{Eq. (1)}$$

$$x_i^{m+1} = \tilde{x}_i^m + F(\tilde{x}_i^m)$$

where $x_i$ represents inputs, G represents a functional operation of the Multi-Head Attention component 111, and F represents a functional operation of the feed-forward network. Eq.(1) is derived by perceiving a layer of Transformer 100 as an implementation of a Euler discretization scheme that attempts to approximate an integral through summation. As shown in FIG. 1, inside each layer of Encoder 110, the input first undergoes a nonlinear transformation G, which corresponds to multi-headed attention and then a skip-connection is used to add the input to the output of G. This combined output is then fed into a feedforward network F and a second skip connection is used to add this combined output (i.e., the input to F) to the output of F.

Figure 2:
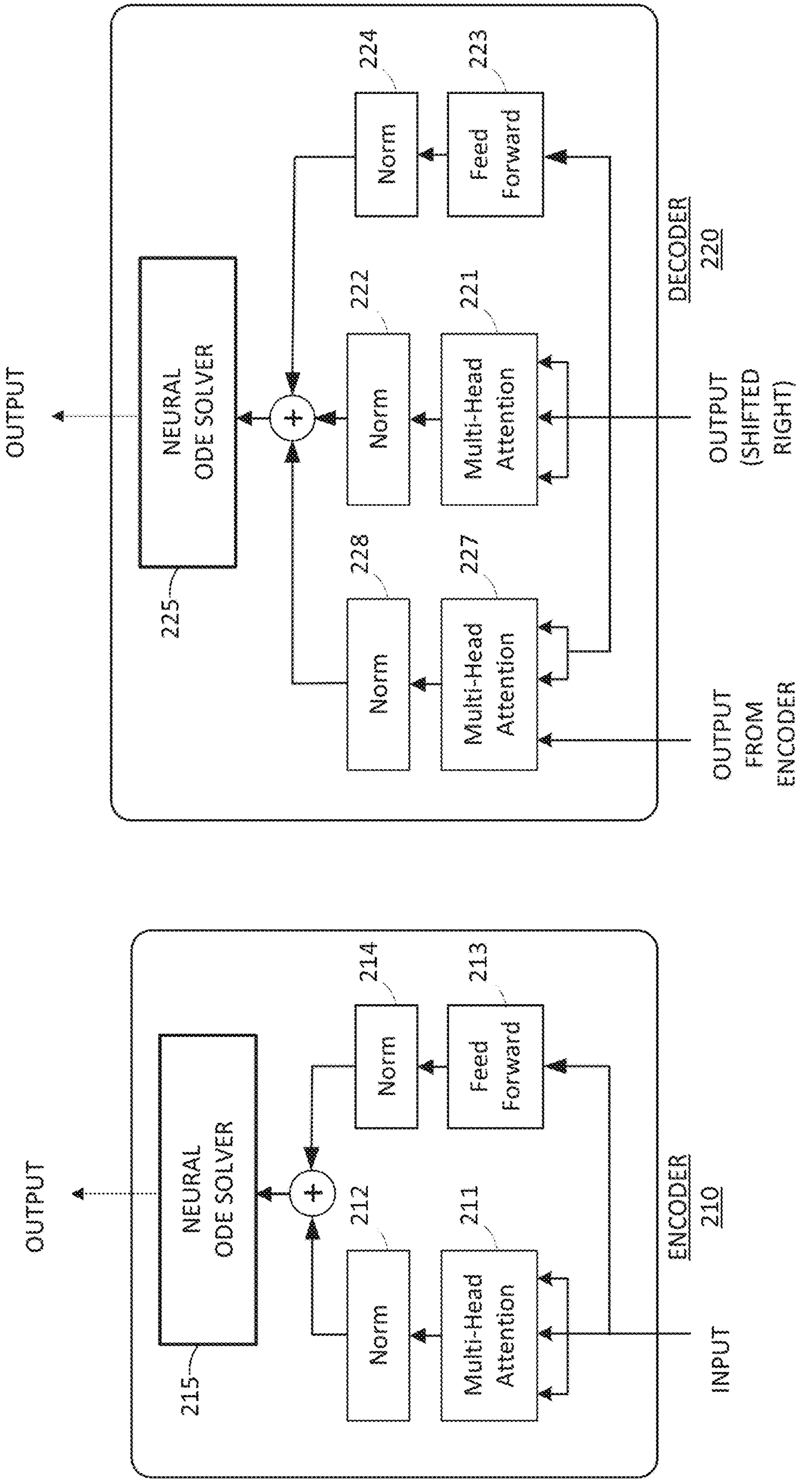
FIG. 2 illustrates an example of Neural ODE enhanced encoder and decoder for (NLP) in accordance with embodiments of this disclosure.

FIG. 2 illustrates an example of enhanced encoder/decoder with Neural ODE solver configured for NLP in accordance with embodiments of this disclosure. Enhanced encoder 210 includes multi-head attention component 211, feed-forward network 213, and Neural ODE solver 215. Operation of multi-head attention component 211, feed-forward network 213 resemble operation of multi-head component 111 and feed-forward network 113. Normalization components 212, 214 are used for normalization of outputs from multi-head attention component 211 and feed-forward network 213, respectively. In an embodiment, Neural ODE solver 215 improves accuracy of the integration that a regular layer of encoder 110 attempts to solve. Neural ODE solver 215 integrates the underlying differential equation governed by the sum of F and G, as a continuous-depth encoder block, which can be represented by the following expression:

$$\frac{d}{dt}\hat{x}_i = F(x_i) + G(x_i, [x_1, x_2, \ldots, x_L]) \qquad \text{Eq. (2)}$$

As this continuous-depth encoder 210 uses a neural ODE solver 215 to integrate the differential equation Eq.(2) instead of using L-layers of multi-headed attention blocks G and feed-forward networks F stacked in a sequential manner, the embodiments can yield similar or improved performance while reducing the number of neural network parameters by a factor of approximately 1/L. Additional savings include elimination of skip feed connections 115, 116.

Similar to enhanced encoder 210, enhanced decoder 220 is enhanced by parallel configuration of multi-head attention components 221, 227 and feed-forward network 223 with continuous depth integration by neural ODE solver 225. In contrast, decoder 102 of conventional Transformer 100 uses L-layers of multi-headed attention blocks and feed-forward networks stacked in a sequential manner. The novel configuration of enhanced decoder 220 reduces the number of neural network parameters compared with decoder 102. Normalization components 222, 228 and 224 are used for normalization of outputs from multi-head attention components 221, 227 and feed-forward network 223, respectively.

Test results of the enhanced encoder 210 used for NLP are compared to conventional models in Table 1. In particular, the NLP task for the test is a language translation task from English to German.

TABLE 1

| Model | Number of Parameters w/o embeddings | Time to Train (hrs.) | BLEU @best | BLEU @epoch50 |
|---|---|---|---|---|
| Transformer (6 layers) | 44,140,544 | 52.975 | 9.063 | 9.241 |
| Neural ODE (time-invariant, 6) | 7,365,632 | 49.830 | 9.331 | 9.289 |

TABLE 1-continued

| Model | Number of Parameters w/o embeddings | Time to Train (hrs.) | BLEU @best | BLEU @epoch50 |
|---|---|---|---|---|
| Neural ODE (time-invariant, 12) | 7,337,920 | 68.428 | 9.214 | 9.234 |
| Neural ODE (time-varying, 6) | 7,528,304 | 72.225 | 9.272 | 9.411 |
| Neural ODE (time-varying, 12) | 7,540,592 | 75.362 | 9.043 | 9.319 |

Four realizations of the enhanced encoder 210/decoder 220 were tested, which include: (a) a time-invariant model with 6 integration time steps, (b) a time-invariant model with 12 integration time steps, (c) a time-varying model with 6 integration time steps, and (d) a time-varying model with 12 integration time steps. For all tested models, time to train and BLEU scores are similar to the baseline Transformer model. However, the advantage and superior performance of the enhanced encoder 210 with parallel integration is demonstrated by significantly reduced number of parameters related to neural network operations, roughly 83% fewer parameters. With less parameters, computation resources are greatly conserved, and model learning is accelerated. The time-invariant model corresponds to a variant of the baseline Transformer model 100 wherein individual Transformer layers share weights and biases among them. In the time-varying version, time-varying differential equations are applied for learning values of multi-headed attention block and the feedforward network. This realization replicates the baseline Transformer model 100 wherein individual Transformer layers do not share any parameters (i.e., weights and biases) among them.

In an embodiment, an implicit, continuous depth layer is used in the encoder 210. In particular, neural ODE solver 215 uses an adjoint sensitivity method to run backpropagation through black-box ODE solvers.

In an embodiment, neural ODE solver 215 uses a tunable parameter that determines the number of time-steps over which the integration would take place. Higher values of this parameter will lead to longer training time; however, these higher values can be viewed as a means to replicate the models which uses many individual Transformer layers.

In an embodiment, an RK4 based numerical integrator uses a fourth-order formula for obtaining numerical solutions of differential equations.

Figure 3:
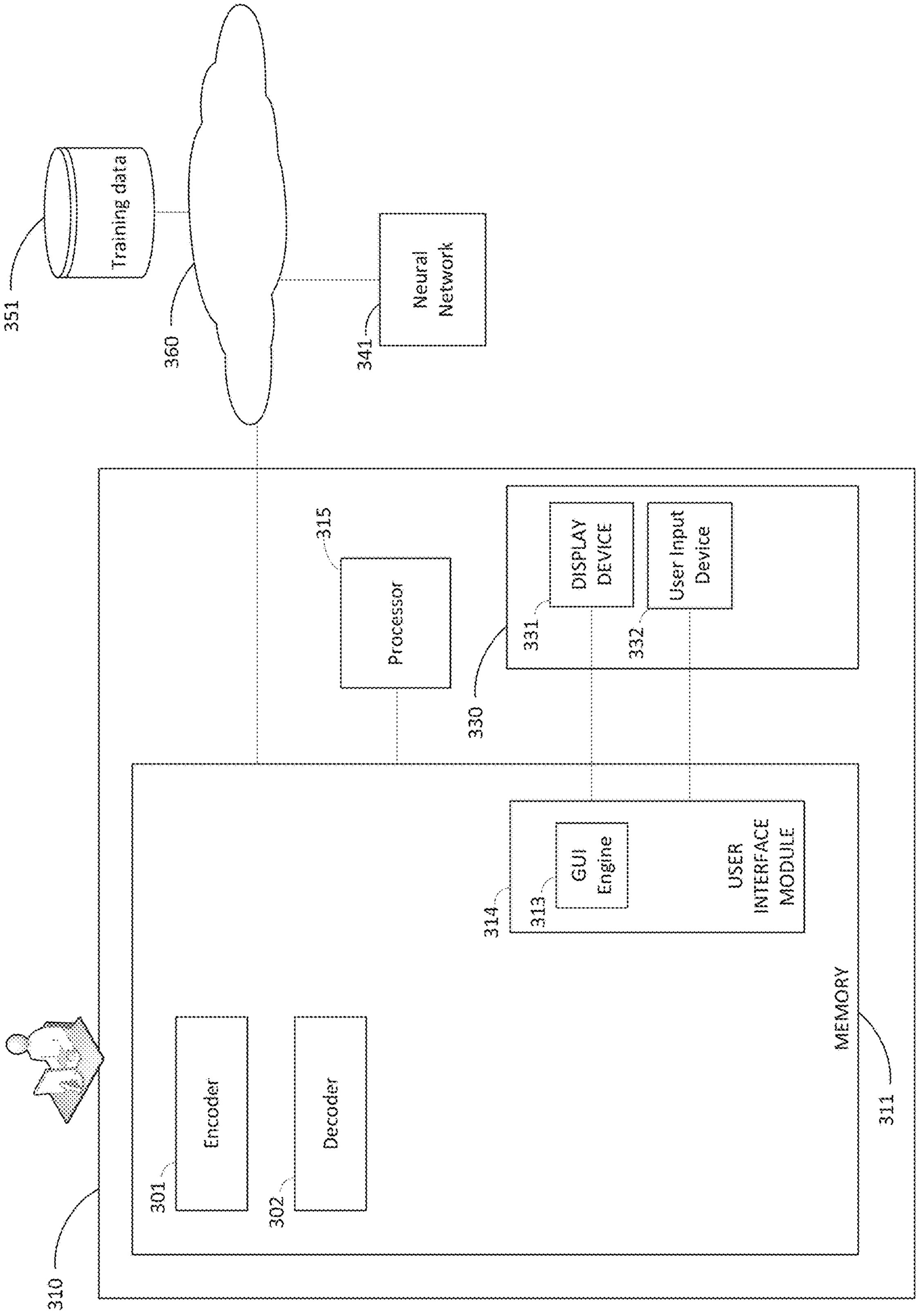
FIG. 3 illustrates an example of a computing environment within which embodiments of the disclosure may be implemented.

FIG. 3 shows an example of a computer environment within which embodiments of the disclosure may be implemented. A computing device 310 includes a processor 315 and memory 311 (e.g., a non-transitory computer readable media) on which is stored various computer applications, modules or executable programs. In an embodiment, computing device includes one or more of the following modules: an encoder 301 and a decoder 302 having functionality as described above for enhanced encoder 210 and enhanced decoder 220.

As shown in FIG. 3, one or more cloud based neural networks (NN) 341 may be implemented for modeling the feed-forward networks 213, 223.

A network 360, such as a local area network (LAN), wide area network (WAN), or an internet based network, connects training data 351 to NN 341 and to modules 301, 302 of computing device 310.

User interface module 314 provides an interface between modules 301, 302, 303 and user interface 330 devices, such as display device 331 and user input device 332. GUI engine

313 drives the display of an interactive user interface on display device 331, allowing a user to receive visualizations of analysis results and assisting user entry of learning objectives and domain constraints for modules 301, 302, 303, and 341.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The program modules, applications, computer-executable instructions, code, or the like depicted in FIG. 3 as being stored in the system memory 311 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 310, and/or hosted on other computing device(s) accessible via one or more of the network(s) 360, may be provided to support functionality provided by the program modules, applications, or computer-executable code and/or additional or alternate functionality. Further, functionality may be modularized differently such that processing described as being supported collectively by the collection of program modules depicted in FIG. 3 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 3 may be implemented, at least partially, in hardware and/or firmware across any number of devices.

It should further be appreciated that the computer system 310 may include alternate and/or additional hardware, software, or firmware components beyond those described or depicted without departing from the scope of the disclosure. More particularly, it should be appreciated that software, firmware, or hardware components depicted as forming part of the computer system 310 are merely illustrative and that some components may not be present or additional components may be provided in various embodiments. While various illustrative program modules have been depicted and described as software modules stored in system memory 311, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for performing a natural language processing task, comprising:

a processor; and a non-transitory memory having stored thereon modules executed by the processor, the modules comprising:

an encoder comprising:

a multi-head attention block configured to perform nonlinear transformation of an input, so as to generate a first output;

a feed-forward network configured to learn parameters, based on the input, that result in a function approximation that defines a second output, wherein the multi-head attention block and the feed-forward network are connected in parallel with each other to generate the first output and the second output at the same time as each other, the first output and the second output combined to produce a summed output; and an ordinary differential equation (ODE) solver configured to perform continuous depth integration of the summed output from the multi-head attention block and the feed- forward network, wherein the encoder operates as a single continuous-depth encoder that replaces multiple sequential layers of a baseline transformer model, thereby reducing a number of neural network parameters compared to sequential layers of the baseline transformer model while maintaining an equivalent quality score for the NLP task.

2. The system of claim 1, wherein the ODE solver uses an adjoint sensitivity method to run back propagation through black-box ODE solvers.

3. The system of claim 1, wherein the ODE solver uses a time-invariant differential equation to learn values of the multi-headed attention block and feed forward network.

4. The system of claim 1, wherein the ODE solver uses a time-varying differential equation to learn values of the multi-headed attention block and feed forward network.

5. The system of claim 1, wherein a tunable parameter determines the number of time steps over which integration is performed.

6. The system of claim 1, wherein a Runge-Kutta (RK4) numerical integrator uses fourth order formula for obtaining numerical solutions of differential equations.

7. The system of claim 1, further comprising:

a decoder comprising:

a first multi-head attention block configured to perform nonlinear transformation of encoder outputs;

a second multi-head attention block configured to perform nonlinear transformation of decoder outputs shifted right;

a second feed-forward network configured to learn parameters that result in a function approximation;

wherein the first multi-head attention block, the second multi-head attention block, and the feed-forward network are connected in parallel to produce a second summed output; and another ODE solver configured to perform continuous depth integration of the second summed output.

8. A computer based method for performing a natural language processing task, comprising:

performing, by a multi-head attention block of an encoder, nonlinear transformation of an input, so as to generate first output;

based on the input, learning, by a feed-forward network, parameters that result in a function approximation, so as to define a second output;

coupling the output of the multi-head attention block and the feed-forward network in parallel with each other to generate the first output and the second output at the same time as each other, the first output and the second output combined to produce a summed output; and performing, by an ordinary differential equation (ODE) solver, continuous depth integration of the summed output from the multi-head attention block and the feed-forward network, wherein the encoder operates as a single continuous-depth encoder that replaces multiple sequential layers of a baseline transformer model, thereby reducing a number of neural network parameters compared to sequential layers of the baseline transformer model while maintaining an equivalent quality score for the NLP task.

9. The method of claim 8, wherein the ODE solver uses an adjoint sensitivity method to run back propagation through black-box ODE solvers.

10. The method of claim 8, wherein the ODE solver uses a time-invariant differential equation to learn values of the multi-headed attention block and feed forward network.

11. The method of claim 8, wherein the ODE solver uses a time-varying differential equation to learn values of the multi-headed attention block and feed forward network.

12. The method of claim 8, wherein a tunable parameter determines the number of time steps over which integration is performed.

13. The method of claim 8, wherein a Runge-Kutta (RK4) numerical integrator uses fourth order formula for obtaining numerical solutions of differential equations.

* * * * *